United States Patent [19]
Boutier

[11] Patent Number: 5,763,531
[45] Date of Patent: Jun. 9, 1998

[54] PREPARATION OF UNSATURATED POLYESTER RESINS

[75] Inventor: Robert H. Boutier, Warminster, Pa.

[73] Assignee: Elf Atochem North America, Inc., Philadelphia, Pa.

[21] Appl. No.: 840,583

[22] Filed: Apr. 22, 1997

[51] Int. Cl.$^6$ ............... C08L 9/00; C08L 67/06
[52] U.S. Cl. ............... 525/171; 525/48; 525/285; 525/338; 528/272
[58] Field of Search ............... 525/171, 285, 525/338, 48; 528/272

[56] References Cited

U.S. PATENT DOCUMENTS 3,705,208   12/1972   Nakamura et al. .............. 525/48

FOREIGN PATENT DOCUMENTS 1396893   6/1975   United Kingdom .

Primary Examiner—Irina S. Zemel

[57] ABSTRACT

Preparation of storage stable, polybutadiene containing, unsaturated polyester resins by heating a mixture containing an unsaturated hydroxyl terminated polybutadiene resin, a saturated anhydride or dibasic acid, an unsaturated anhydride or dibasic acid, a polymerization inhibitor and, optionally, a saturated glycol, while removing water as it is formed, the molar ratio of the saturated anhydride or acid to the unsaturated anhydride or acid being at least equal to 2.

2 Claims, No Drawings

PREPARATION OF UNSATURATED POLYESTER RESINS

BACKGROUND OF THE INVENTION

This invention relates to the preparation of unsaturated polyester resins, particularly to the preparation of storage-stable, polybutadiene-containing, unsaturated polyester resins which have utility as electrical potting and encapsulation materials or as flexibilizers for traditional unsaturated polyesters. These materials have a long shelf life, even when a free radical initiator, such as an organic peroxide, is added during storage.

BRIEF SUMMARY OF THE INVENTION

A process for preparing storage-stable, polybutadiene-containing, unsaturated polyester resin is provided, which process comprises heating a mixture containing (a) an unsaturated, hydroxyl terminated polybutadiene resin, (b) a saturated anhydride or dibasic acid, (c) an unsaturated anhydride or dibasic acid, (d) a polymerization inhibitor (preferably diethylhydroxylamine) and, optionally, (e) a saturated glycol, while removing water as it is formed, the molar ratio of (b) to (c) being at least 2, preferably about 3.

DETAILED DESCRIPTION

By using polymerization inhibitors and the proper ratio of saturated anhydride or acid to unsaturated anhydride or acid, it has now been discovered that storage stable, polybutadiene-containing, unsaturated polyester resin can be produced without having to hydrogenate the polybutadiene resin prior to synthesis.

Examples of useful hydroxyl terminated polybutadiene resins are Poly bd® resins available commercially from Elf Atochem, such as Poly bd R-45HT and Poly bd R-20LM, hydroxyl terminated polybutadiene resins having number average molecular weights, "$M_n$", of 2800 and 1200, respectively. The resins will typically have a $M_n$ of from about 1000 up to about 3000.

Examples of saturated anhydrides or dibasic acids include phthalic anhydride, isophthalic acid, terephthalic acid, tetrahydrophthalic anhydride, hexahydrophthalic anhydride, succinic acid, glutaric acid, adipic acid and sebacic acid. These saturated compounds can be aliphatic or aromatic, as long as they do not undergo free-radical polymerization.

Examples of unsaturated anhydrides or diacids are maleic anhydride, fumaric acid, chloromaleic acid and itaconic acid. The molar ratio of saturated anhydride or diacid to unsaturated anhydride or diacid must be greater than or equal to 2, preferably about 3.

An example of a saturated glycol is neopentyl glycol.

A polymerization inhibitor such as diethylhydroxylamine ("DEHA") must be used to prevent the polymer from gelling during heating. The effective amount varies with the particular inhibitor, typically being in the range of from about 0.1 to about 5.0 percent by weight of the reactants, preferably about 0.25 to 0.50%.

The reaction temperature varies with the identity of the reactants, but typically is in the range of from about 170° C. to about 220° C., preferably about 195° C. to about 205° C. The pressure may be atmospheric.

An example of such a preparation was to charge to a reactor, in parts by weight, 100 parts of Poly bd R-45HT, 15 parts neopentyl glycol, 16.8 parts phthalic anhydride, 3.7 parts maleic anhydride and 1 part DEHA, which reactor was then heated to 205° C. while removing water. The resulting resin needed no dilution in solvent for stability purposes.

Applications of these resins include the potting and encapsulation of electronic devices and their use as a flexibilizer and/or impact modifier for traditional unsaturated resins.

I claim:

1. A process for preparing storage-stable, polybutadiene-containing, unsaturated polyester resin comprising heating a mixture containing (a) an unsaturated, hydroxyl terminated polybutadiene resin, (b) a saturated anhydride or dibasic acid, (c) an unsaturated anhydride or dibasic acid, (d) a polymerization inhibitor and, optionally, (e) a saturated glycol, while removing water as it is formed, the molar ratio of (b) to (c) being at least 2.

2. The process of claim 1 wherein the inhibitor is diethylhydroxylamine.

* * * * *